United States Patent

[11] 3,625,254

[72] Inventor Roger A. Rice
 Joliet, Ill.
[21] Appl. No. 18,997
[22] Filed Mar. 12, 1970
[45] Patented Dec. 7, 1971
[73] Assignee Caterpillar Tractor Co.
 Peoria, Ill.

[54] SEGMENTED VALVE SPOOL
 16 Claims, 1 Drawing Fig.

[52] U.S. Cl. .................................................. 137/625.66
[51] Int. Cl. .................................................. F16k 11/07
[50] Field of Search ............................. 137/625.6–625.69

[56] References Cited
UNITED STATES PATENTS
2,621,676 12/1952 Loft .............................. 137/625.6
3,163,175 12/1964 Pearson ..................... 137/625.69 X
3,307,586 3/1967 Meyer ......................... 137/625.69

Primary Examiner—Henry T. Klinksiek
Attorney—Fryer, Tjensvold, Feix, Phillips & Lempio ABSTRACT: A segmented valve spool in a fluid control valve permitting very accurate control over spacing between various portions of the spool. The segmented spool portions are selectively separated by shims with resilient means such as springs urging the spool segments toward each other. To avoid binding of the segmented spool within a spool bore, each shim assembly includes a tapered member or ball to establish point contact between each pair of adjacent spool segments.

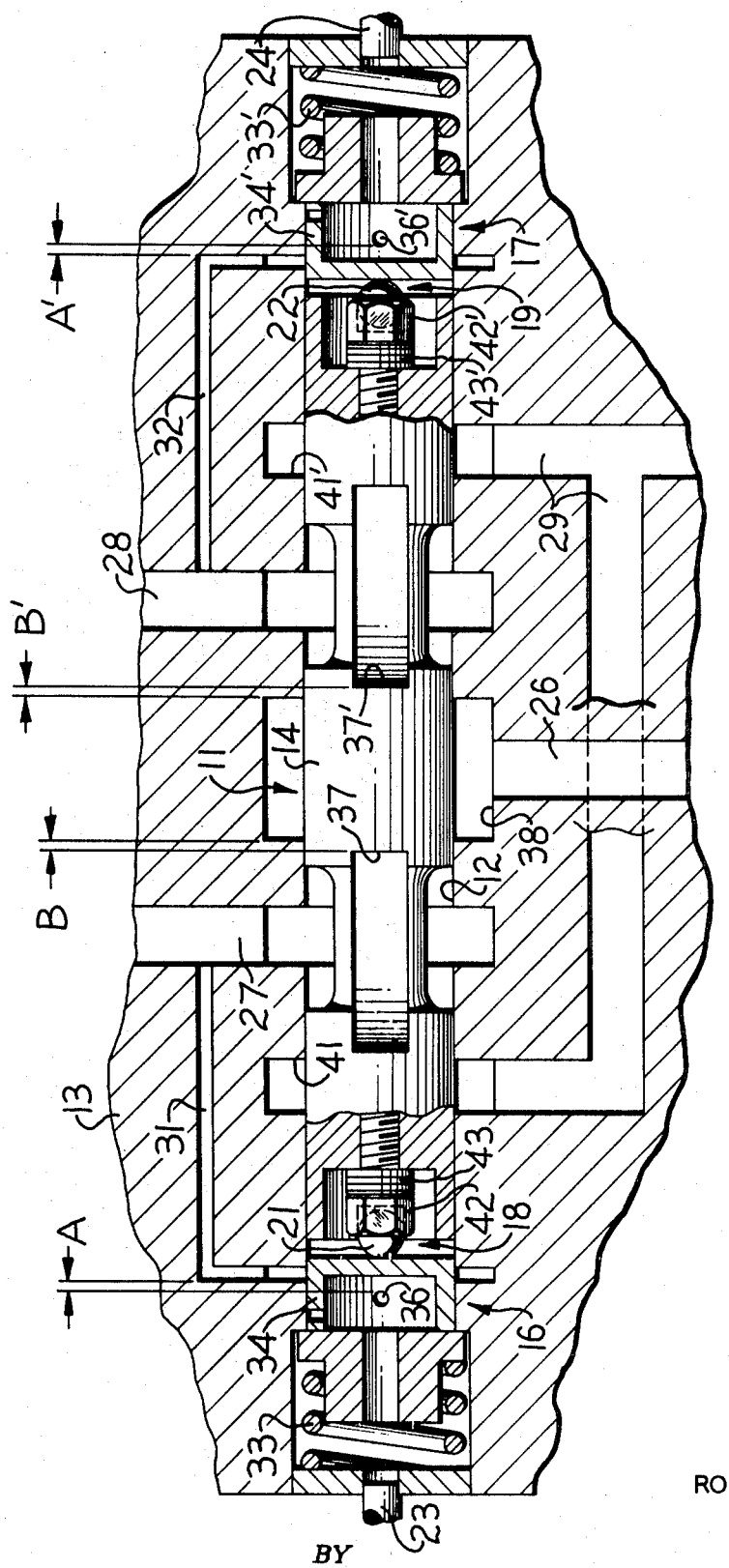

SEGMENTED VALVE SPOOL

The present invention relates to fluid control valves and more particularly to such valves wherein a segmented spool is employed to closely control the spatial relationship between various portions of the spool.

The present invention is described below with particular reference to a pilot control flow valve wherein a flow control portion of the valve spool is positioned by pilot fluid which operates one or more actuating portions of the spool. Flow control valves of this type are commonly employed for regulating hydraulic steering motors on various vehicles such as earthmoving machinery. A flow control system of the type wherein use of the flow control valve is particularly contemplated is described in greater detail in application Ser. No. 712,747, filed Mar. 13, 1968, now U.S. Pat. No. 3,566,749, by Thomas E. Allen, et al., entitled "Hydraulic Flow Amplifier Valve" and assigned to the assignee of the present invention.

In addition to hydraulic flow control systems for hydraulic steering motors, control valves of the type contemplated by the present invention may also be used wherever accurate regulation of a hydraulic motor is desired. Further, although the present invention is particularly described with reference to a pilot-actuated control valve, it will be apparent that the present invention may also be embodied within various other valve spools wherever spacing between various portions of the spool is critical.

According, it is an object of the present invention to provide very close tolerance adjustment between various portions of a spool-type control valve.

It is a further object of the invention to provide for close control over spacing between various portions of a spool and various portions of a valve body within which the spool is mounted.

The present invention further contemplates a segmented valve spool for fulfilling one or more of the above objects and also minimizing tendencies of the segmented spool to bind within its spool bore.

Exemplary apparatus for fulfilling the above objects and advantages is described in detail, and additional objects and advantages of the present invention are made apparent in the following description having reference to the accompanying drawing.

The drawing is a partially sectioned view of a segmented valve spool according to the present invention arranged within the bore of a suitable valve body.

Referring now to the drawing, a segmented spool 11 is arranged for reciprocating or longitudinal motion within a cylindrical bore 12 formed by a valve body 13. The segmented spool includes a flow control spool segment 14 centrally arranged in a bore 12 of the valve body 13 with actuating spool segments 16 and 17 arranged at the respective ends of the control segment 14.

Shim assemblies 18 and 19 are respectively arranged between adjacent pairs of spool segments to provide close, variable control over the spacing between various portions of the different spool segments. Each of the shim assemblies includes a tapered member or ball indicated at 21 and 22 respectively. The balls 21, 22 provide point contact between the central spool segment 14 and each of the actuating segments 16, 17 to minimize binding of the segmented spool within the bore 12.

The valve body 13 includes various internal passages which are placed in communication with each other across the bore 12 by the segmented spool. Pilot fluid for operating the actuating segments 16, 17 is introduced into respective ends of the bore 12 through passages 23 and 24. Main rail fluid, for example, from a pump (not shown), enters the valve body through an inlet passage 26 and upon selective positioning of the control spool segment 14, is directed across the bore 12 into one of two outlet passages 27 and 28. When the inlet conduit 26 is in communication with one of the outlet passages, for example, that one indicated at 27, the other passage 28 is also in communication across the bore 12 with a common drain passage indicated at 29. The valve body also includes outlet passages 31 and 32 for receiving pilot fluid from the actuating spool segments 16 and 17 respectively.

Since the segmented spool 11 is symmetrical about its axial center point, construction details at the left end of the segmented spool, as viewed in the drawing, are described with the same features at the other end of the spool assembly being indicated by similar primed numerals. The actuating segments 16, 17 are maintained in respective contact with the central spool segment 14 through the balls 21, 22 by means of centering springs 33 and 33' which interact between the actuating segments 16, 17 and respective ends of the bore 12. In a normal condition as shown in the drawing, the segmented spool 11 is centered within the bore 12 by the springs.

The actuating segment 16 includes a piston element 34 for receiving fluid from the pilot inlet passage 23. The piston 34 includes a metering port 36 which is normally maintained out of communication with the passage 31 by spacing indicated at A. The same spacing between the metering port 36' in the piston 34' and the outlet passage 32 is similarly indicated at A'.

The flow control segment 14 has metering slots 37 and 37' for communicating fluid from the inlet passage 26 to the outlet passages 27 and 28 respectively when the flow control segment 14 is properly positioned by the actuating segments 16 and 17. The distance between the two metering slots 37 and 37' is not particularly critical except that it must be greater than the width of the annular recess 38 by which the inlet 26 is communicated into the spool bore 12. Thus, when the control spool segment 14 is normally located in a central position as shown in the drawing, the metering slots 37 and 37' are isolated from the annular recess 38 by spacings indicated respectively at B and B'.

Particularly critical dimensions for the segmented spool 11 are the pairs of dimensions indicated by the letters A, B and those indicated at A', B'. Thus, it is necessary to very closely control distances between the metering slots 37, 37' and the metering ports 36, 36'. For example, when the flow control segment 14 is shifted rightwardly, as seen in the drawing by pilot fluid from the passage 23 acting upon the segment 16, the metering port 36 must enter into communication with the outlet passage 31 at substantially the same time that the metering slot 37 enters into communication with the annular recess 38. In that manner, main rail fluid flow across the metering slot 37 is maintained in direct proportion to pilot fluid flow from the metering slot 36 into the outlet passage 31. When the flow control valve illustrated in the drawing is employed to operate hydraulic steering motors, for example, very close control over these dimensions is necessary to avoid erratic steering operation. Further, if one of the metering slots 27, 37' when normally positioned, were to permit even slight communication between the inlet passage 26 and one of the outlet passages 27, 28, operation of the hydraulic steering motors could occur independently from actuation of the control valve.

In an exemplary embodiment for a control valve of the type illustrated in the drawing, it has been found that tolerance limits of plus or minus 0.003 inches is desirable for critical portions of the control valve spool. Tolerances in this range are very difficult if not impossible to maintain in normal production operations. The present invention permits these critical dimensions to be established after the spool assembly 11 is completed. Spacing between the control spool segment 14 and the respective actuating segments 16, 17 is then adjusted by means of the shim assemblies 18 and 19.

If is further desirable that when one of the outlet passages, for example that indicated at 27, enters into communication with the inlet passage 26, the other outlet passage 28 should almost simultaneously enter into communication with the common drain passage 29 as is conventional for double-acting, hydraulic systems. Thus, distances between the normally positioned metering slots 37, 37' and annular recesses 41, 41' which communicate the common drain passage 29 with the valve bore 12, should preferably be the same as the spacing B, B' between the metering slots 37, 37' and the annular recess 38. The spacings between the metering slots and the drain passages are not illustrated upon the drawing, however, since they are not as critical as the dimensions which are described above and are illustrated on the drawing.

As noted above, the shim assemblies 18, 19 permit accurate adjustment of the dimensions between various portions of the segmented spool assembly. Additionally, they provide point contacts between the control spool segment 14 and the actuating spool segments 16, 17 to avoid binding of the segmented spool assemblies within the bore 12. As seen in the drawing, the balls 21, 22 are respectively supported by capscrews 42 and 42' which are threaded into opposite ends of the control spool segment 14. Spacing between the balls 21, 22 and the control spool segment 14 is established by a variable number of shims indicated at 43 and 43' between the control spool segment 14 and the capscrews 42, 42' respectively.

What is claimed is:

1. A pilot-operated, flow control valve comprising a valve body defining a cylindrical bore and a plurality of fluid passages in communication with the bore, and a segmented control valve spool including a flow control spool segment arranged for longitudinal motion within the bore to selectively regulate fluid flow between the valve body passages, an actuating spool segment arranged at one end of the flow control segment, the actuating spool segment being operable by pilot fluid flow to longitudinally position the flow control spool segment, shim means being arranged between the segments to establish spacing therebetween and spring means acting on opposite ends of the two segments to maintain them in contact through the shim means.

2. The invention of claim 1 wherein the shim means includes a tapered member secured to one of the segments for providing point contact with the other segment, a variable member of shims being arranged between the member and the one segment.

3. The invention of claim 2 wherein thickness of the shims is selected to permit portions of the two segments to enter into communication with respective fluid passages in the valve body at substantially the same time.

4. A flow control valve comprising a valve body defining a cylindrical bore and a plurality of fluid passages, a segmented control valve spool including a fluid flow control segment arranged for reciprocal motion within the bore to regulate fluid flow between the passages in said valve body, a spool actuating segment axially aligned with the flow control segment at one end thereof and shim means arranged between the two segments of said spool, spacing between the two segments being established by said shim means and maintained at least partly by spring means arranged for interaction with the segments.

5. The invention of claim 4 wherein the shim means includes a tapered member secured to one of the segments for providing point contact with the other segment, spacing between the point contact of the member and the one segment being adjustable according to a variable number of shims arranged therebetween.

6. The invention of claim 5 wherein the shim means includes a ball mounted on a capscrew which is threadable into an end of the one segment with a variable number of shims on its shank to establish spacing between the ball and the one spool segment.

7. The invention of claim 4 wherein the actuating segment is a spring-loaded piston suitable for hydraulic pilot operation of the control spool segment, the piston defining a chamber for receiving pilot-actuating fluid and means for selectively communicating the chamber with an outlet passage in the valve body simultaneously as the flow control segment is longitudinally positioned by the piston to provide fluid communication between a plurality of passages in the valve body across the spool bore.

8. The invention of claim 7 including similar actuating segments arranged at each end of the flow control spool segment for providing double-acting operation of the fluid control valve.

9. A pilot-operated, double-acting flow control valve, comprising a valve body defining a cylindrical spool bore and a plurality of fluid passages in communication with the bore, and a segmented control valve spool including a flow control spool segment arranged for reciprocal motion within the bore to selectively regulate fluid flow from an inlet passage in the valve body to outlet passages in the valve body, an actuating spool segment arranged at each end of the flow control segment with spring means urging them toward the flow control segment, each actuating spool segment entering into communication with a pilot fluid outlet in the valve body at substantially the same time that the flow control spool segment communicates the inlet passage with one of the outlet passages, and shim means arranged between each adjacent pair of spool segments to establish spacing therebetween which is maintained by the spring means acting upon the actuating spool segments.

10. The invention of claim 9 wherein the shim means between each adjacent pair of spool segments includes a tapered member secured to one of the segments for providing point contact with the other segment, spacing between the point contact of the tapered member and the one segment being adjustable, according to a variable number of shims arranged therebetween.

11. The invention of claim 9 wherein the flow control spool segment is also effective to communicate another passage in the valve body with a drain conduit at substantially the same time that it communicates the inlet passage with the one outlet passage.

12. A valve comprising a valve body defining a cylindrical bore, the valve body also defining a plurality of fluid passages in communication with the bore, and a segmented valve spool arranged for longitudinal motion within the bore, shim means being arranged between the segments to establish spacing therebetween and resilient means interacting with at least one of the spool segments to maintain the spacing established therebetween by the shim means.

13. The invention of claim 12 wherein the shim means includes a tapered member secured to one of the segments for providing point contact with the other segment and a variable number of shims arranged between the member and one segment.

14. The invention of claim 13 wherein the tapered member comprises a ball forming the contact point.

15. The invention of claim 12 wherein the segments include a main fluid flow control spool segment and an actuating spool segment for positioning the control spool segment.

16. The invention of claim 15 wherein the actuating spool segment is controlled by pilot fluid flow, spacing between the segments being established by the shim means so that portions of the two segments enter into communication with respective passages in the valve body at substantially the same time.

* * * * *